United States Patent [19]

Hashida et al.

[11] Patent Number: 5,079,061
[45] Date of Patent: Jan. 7, 1992

[54] OPTICAL STORAGE MEDIA

[75] Inventors: Takashi Hashida, Osaka; Eiji Ando, Katano; Yoshiki Goto, Nara, all of Japan

[73] Assignee: Matsushita Electric Industrial Co., Ltd., Osaka, Japan

[21] Appl. No.: 482,895

[22] Filed: Feb. 22, 1990

[30] Foreign Application Priority Data

Feb. 27, 1989 [JP] Japan .................... 1-046000
Jun. 23, 1989 [JP] Japan .................... 1-161635

[51] Int. Cl.$^5$ .................................. B32B 3/02
[52] U.S. Cl. ............................. 428/64; 428/65; 428/913; 430/270; 430/495; 430/945; 346/76 L; 346/135.1; 369/288
[58] Field of Search .......... 430/270, 495, 995, 962; 428/64, 65, 913; 346/76 L, 135.1; 369/288

[56] References Cited

U.S. PATENT DOCUMENTS

| 4,686,169 | 8/1987 | Yoshino et al. ............ 430/962 |
| 4,737,427 | 4/1988 | Miyazaki et al. ........... 346/135.1 |
| 4,794,068 | 12/1988 | Miyazaki et al. ........... 430/962 |
| 4,845,021 | 7/1989 | Miyazaki et al. ........... 430/962 |

FOREIGN PATENT DOCUMENTS 0385344 9/1990 European Pat. Off. .
01-148590 6/1989 Japan .

Primary Examiner—Patrick J. Ryan
Attorney, Agent, or Firm—Stevens, Davis, Miller & Mosher

[57] ABSTRACT

The optical storage medium of the present invention comprises: (1) a substrate; (2) ultra-thin recording layers containing a dye; and (3) controlling layers. The recording layers and the controlling layers are accumulated alternately, and the uppermost layer is a controlling layer. The optical storage medium of the present invention contains dye cohesions in the recording layer in an extremely small amount and of extremely small size so that the medium can store a high density of records.

8 Claims, 7 Drawing Sheets

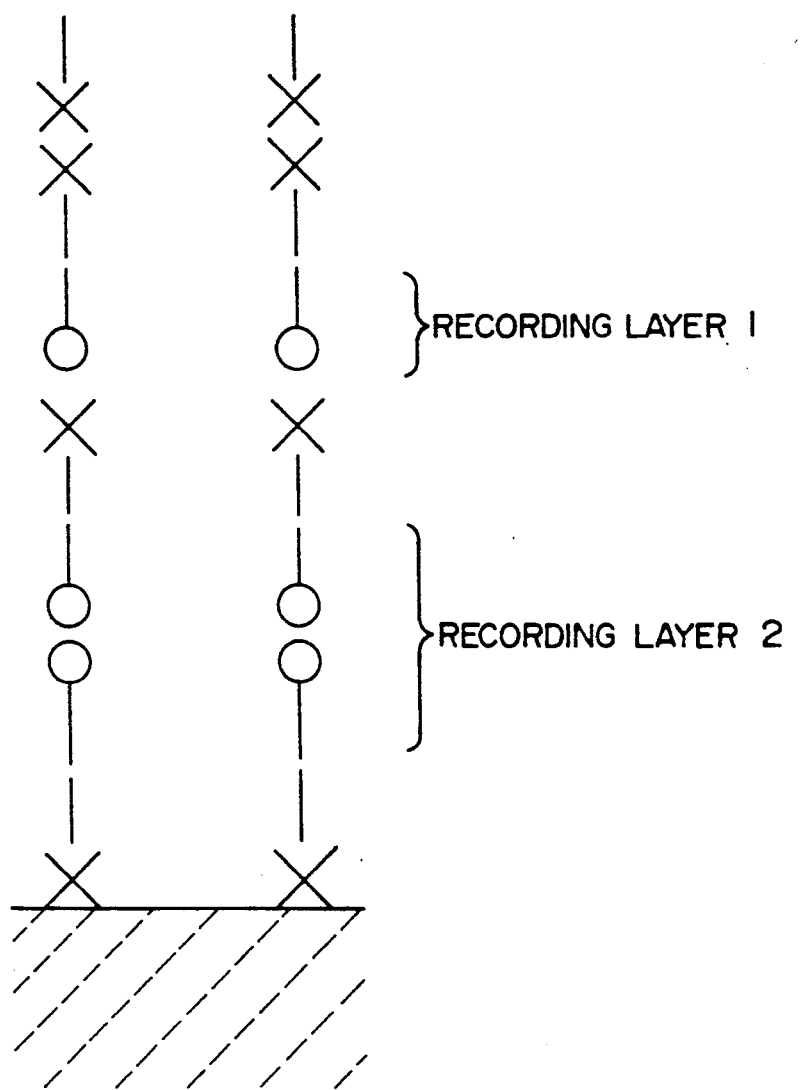

F I G. 4
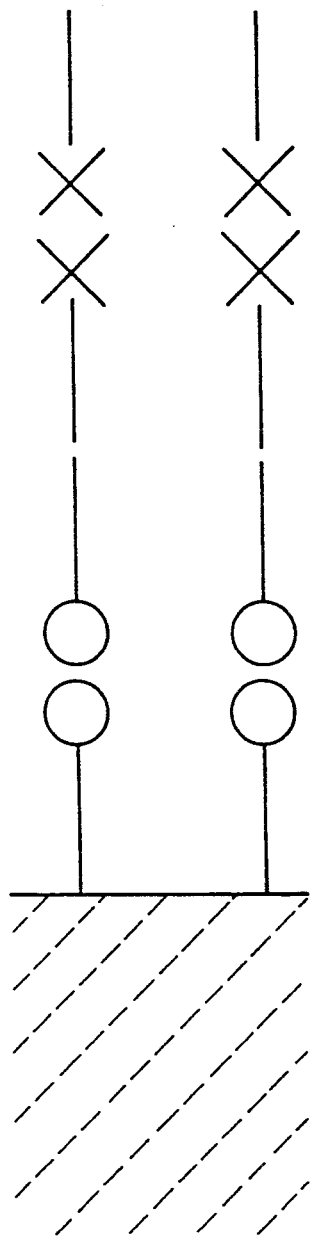

F I G. 6
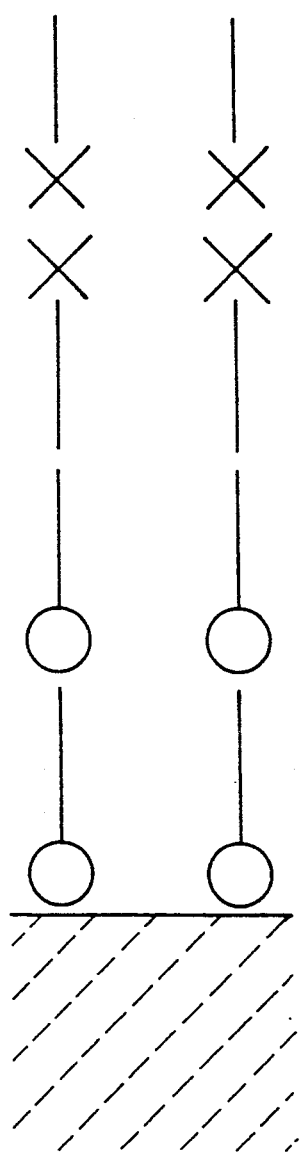

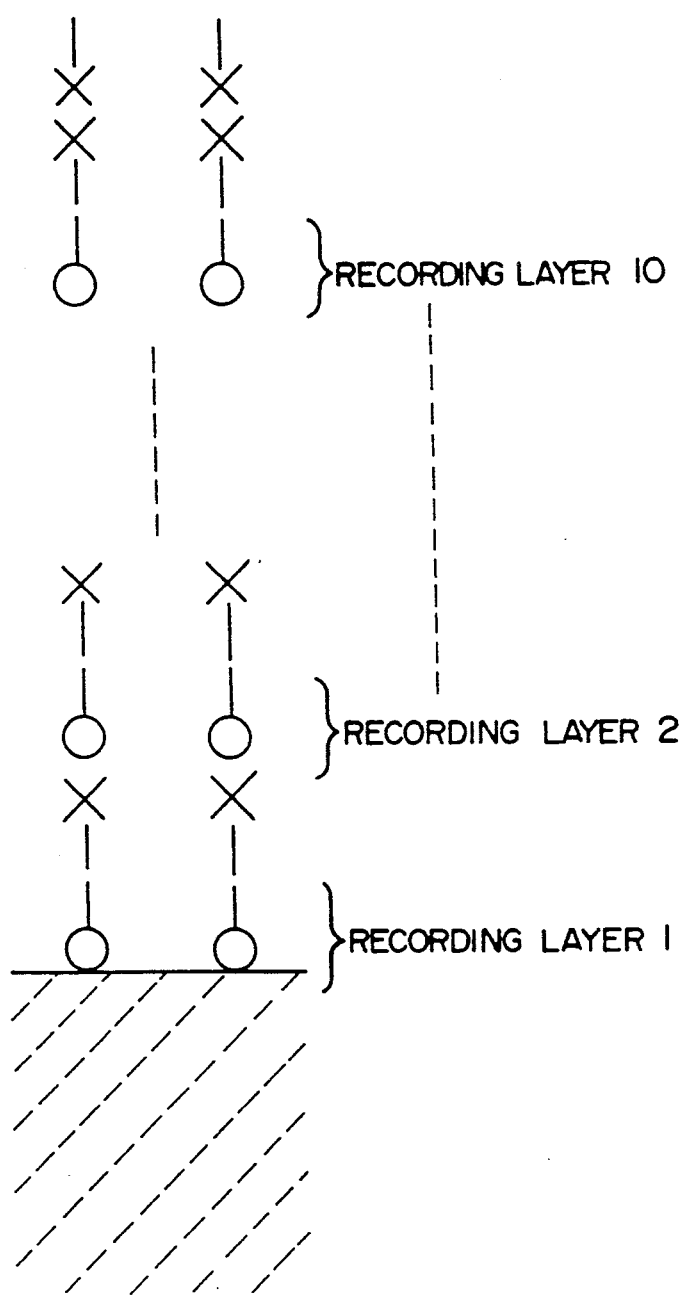

OPTICAL STORAGE MEDIA

The present invention relates to optical storage media containing an organic dye, which perform recording and regeneration Optical storage media containing an organic dye dispersed in a thin polymer film have so far been prepared by a spin coating method or the like. As to these optical storage media, the recording is performed by projecting a visible laser beam onto the media and thereby reducing the absorption and reflection in the visible region in the media. The regeneration is performed by projecting a weak visible light onto the media and detecting the absorbed and reflected lights.

As to these conventional storage media, however, the organic dye present in the recording layer tends to form cohesions. The formation of the cohesions is promoted particularly at elevated temperatures. As a result, the concentration of organic dye contained in the storage media becomes uneven. In the case where the diameter of recording area is smaller than the size of cohesion, the recording is difficult to perform and the difficulty in recording reduces the recording density.

A problem that the present inventors have tried to solve is to make smaller the cohesion of the organic dye formed in the recording layer of optical storage media. The problem could not be solved with the conventional media having separating layers.

The present invention is based on the finding that an optical storage medium comprising recording layers containing an organic dye and controlling layers alternately provided in the form of a ultra-thin layer and a controlling layer as the uppermost layer can solve the above-mentioned problem. The recording layer is preferably one or two monomolecular layers. FIG. 1 illustrates an embodiment of the storage media.

The reason why the dye cohesions can be made smaller in the media is probably because the cohesion formation of the molecules in the layer is suppressed by dividing the recording layers by the controlling layers into ultra-thin layers, particularly into one or two monomolecular layers.

Thus, according to the present invention, there is provided an optical storage medium comprising:
(1) a substrate,
(2) an ultra-thin recording layer containing a dye, and
(3) a controlling layer,
the controlling layer being sandwiched between the substate (1) and the recording layer (2); and an optical storage medium comprising:
(1) a substrate,
(2) ultra-thin recording layers containing a dye, and
(3) controlling layers,
the recording layers and the controlling layers being accumulated alternately and the uppermost layer being a controlling layer.

FIGS. 2 to 9 and 10 illustrate various types of accumulation of the layers in the examples of the present invention, wherein:
o is the hydrophilic head of organic dye molecule,
x is the hydrophilic head of barium stearate molecule,
Δ is the hydrophilic head of stearic acid molecule, and
- is a hydrophobic tail of molecular chain.

Figure 1:
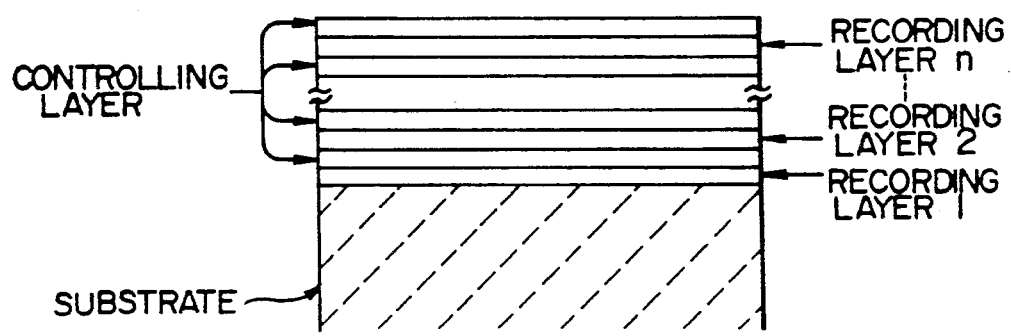
FIG. 1 illustrates an essential constitution of the optical storage medium of the present invention.

The material or constituents, shape and size of the substrate usable in the present invention is not critical. The conventional substrate may be used. Specific examples of the substrate usable in the present invention are quartz; polymeric materials such as polycarbonate, acrylic polymers, polyolefins and the like; various metals; and inorganic monocrystals such as calcium fluoride and the like.

In the present invention, the term "recording layer" means a layer comprising at least one monomolecular layer containing a dye.

The recording layer may contain only a dye or contain a dye and other substances.

The term "ultra-thin" refers to the thickness of from one to about five monomolecular layers.

The term "dye" means a substance which shows absorption in the visible region and takes part in an optical change such as absorption, reflection and the like due to a photo reaction or thermal reaction upon irradiation with light. The photo reaction includes oxidation, reduction, cis-trans isomerization, proton transfer, ion pair formation, ring-opening and ring-closing reaction. The thermal reaction includes sublimation and decomposition. Specific examples of organic substances capable of taking part in the photo reaction are viologens, endoperoxides, stilbenes, azobenzenes, indigoes, spiropyranes, azomethinimines, dihydroindolizines, flugides, and the like. Specific examples of organic substances on which termal reaction can be utilized are cyanine dyes, merocyanine dyes, porphyrin dyes, azo dyes, styryl dyes, phthalocyanine dyes, xanthene dyes, thiazole dyes, carbonium dyes, azine dyes, pyridine dyes, quinoline dyes, anthraquinone dyes, benzophenone dyes, benzoquinone dyes, naphthoquinone dyes, flavon dyes, xanthone dyes, pyrazolone dyes, nitro dyes, nitroso dyes, and the like.

Of these, preferable are cyanine dyes and photochromic compounds having the formula:

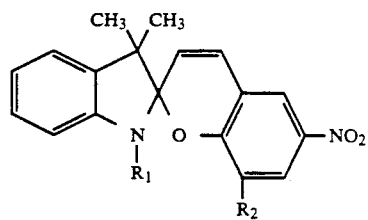

wherein $R_1$ represents a hydrocarbon group, and $R_2$ represents $R_3$, $-OR_3$ or $-CH_2OCOR_3$ ($R_3$ is hydrogen or a hydrocarbon group), provided that at least one of $R_1$ and $R_2$ is a hydrocarbon group having 11–31 carbon atoms. More preferable are compounds having the formulas:

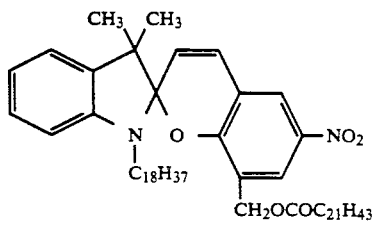

SP1822

-continued

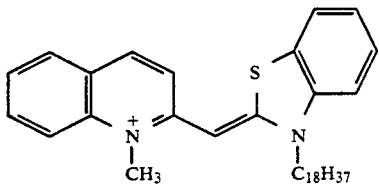

CN18

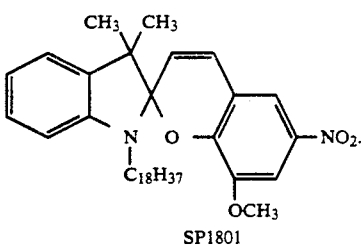

SP1801

The recording layer may contain compounds other than the dye. If the recording layer contains a mixture of the dye and other compounds, the advantage of preventing the formation of cohesions is satisfactory even at high temperatures. The compounds to be mixed with the dye are preferably metallic salts of fatty acids, free fatty acids, alcohols, amines, amides, hydrocarbons and the like. Octadecane and stearic acid are more preferable. This is probably because such mixtures disturb the migration and cohesion formation of dye molecules.

The recording layer consists of one to about five monomolecular layers, preferably one or two monomolecular layers.

As the material constituting the controlling layer, metallic salts of fatty acids, fatty acids, alcohols, amines, amides and the like are suitable. Of these, barium stearate, cadmium stearate, stearyl alcohol, stearylamine, stearamide, $C_{31}H_{63}COOH$, $C_{18}H_{37}COOH$ and $C_{13}H_{27}COOH$ are preferable. Since the recording layer is sandwiched between the controlling layers, the migration and cohesion formation of dye molecules in the recording layer are suppressed.

The organic compounds to be mixed into the recording layer and those to be used in the controlling layer are preferably those having a $C_{11}$–$C_{31}$ long chain hydrocarbon group. This is because these compounds are well balanced between hydrophilic and hydrophobic characters and capable of giving layers of desirable properties. In other words, the use of such compounds makes it easy to provide optical storage media comprising alternately formed recording layers and controlling layers, both being ultra-thin layers.

However, the thickness of the controlling layer is not critical.

Lamination of the recording layers and controlling layers onto the substrate may be carried out according to the conventional methods. Preferably the Langmuir-Blodgett method (hereinafter LB method) is applied.

In the optical storage media of the present invention, the controlling layers play a role of suppressing the formation of cohesion of the dye molecules. Particularly when the recording layer is constituted of one monomolecular layer, a very uniform film is obtained according to the invention.

According to an embodiment, one storage medium comprises a plurality of different recording layers. According to another embodiment, the number of monomolecular layers differs from one recording layer to another recording layer. For example, when a certain dye is present in two different layers, i.e. recording layer 1 is constituted of one monomolecular layer and recording layer 2 is constituted of two monomolecular layers, as shown in FIG. 2, these recording layers exhibit different absorption maximum wavelength from each other. By utilizing this, a wavelength-multiplexing recording (U.S. Pat. No. 4,737, 427) becomes performable and the recording density can be doubled by using only one kind of dye.

The present invention is explained in more detail with reference to the accompanying drawings. In the working examples below, organic dyes having the formulas below (hereinafter referred to as SP1822, SP1801 and CN18) were used. SP1822 and SP1801 are described in Thin Solid Films, 133, 21 (1985) and Thin Solid Films, 160, 279 (1988), and they can be synthesized according to these papers. CN18 is commercially available (manufactured by Nippon Kanko Shikiso Inc.). SP1822 and SP1801 are organic dyes capable of taking part in a photo reaction. Before recording use, they are once colored by ultraviolet irradiation and then returned to colorless by visible laser irradiation. After recording, the record can be deleted by returning them to colored by ultraviolet irradiation. Compounds similar to SP1822 or SP1801 and different from them in the length of hydrocarbon chain can also be accumulated easily according to the LB method regardless of the length of chain so long as their structures are within the scope of claim of the present invention. They are also able to suppress the formation of aggregates as in SP1822 or SP1801 in the examples below. Regarding the compounds containing a chain of 32 or more carbon atoms, they are expected to behave similarly although their behavior cannot be ascertained due to their unavailability.

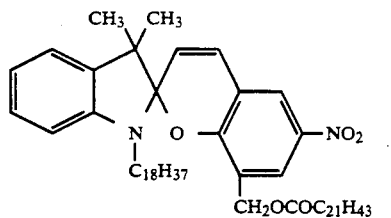

SP1822

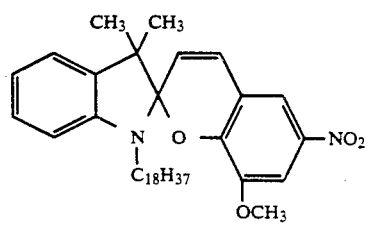

SP1801

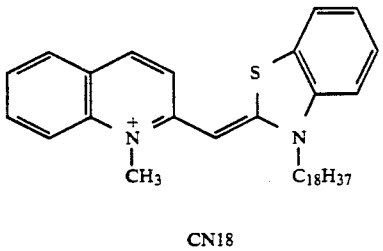

CN18

EXAMPLE 1

A storage medium was prepared by the spin coating method. The influence of the controlling layer to the properties of the medium was investigated.

Figure 3:
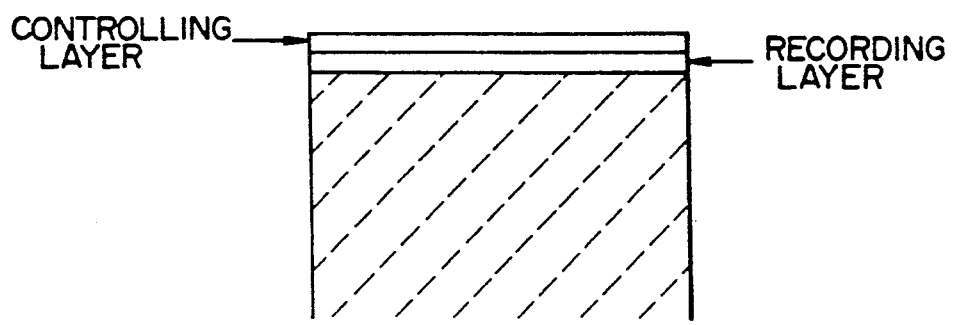

Thus, a recording layer consisting of SP1822 was formed as a layer having a thickness of 120 angstroms on a substrate of quartz. A controlling layer consisting of polyvinyl alcohol was formed thereon to obtain a storage medium. The conditions of the spin coating were as follows:

Thin Film-Forming Condition 1: Recording layer 1.5% (by weight) solution of SP1822 in toluene, 3,000 rpm Thin Film-Forming Condition 2: Controlling layer 0.3% (by weight) solution of polyvinyl alcohol, 3,000 rpm FIG. 3 summarizes the construction of the medium.

The storage medium thus obtained was irradiated with ultraviolet light at 35° C. for 30 minutes with an ultraviolet lamp. The reaction of converting the colorless form to the colored form proceeded. Observation of the recording layer with an optical microscope revealed that the size of cohesion was 2 microns or less and the dye was uniformity dispersed in the recording layer.

This recording layer enabled the recording with visible laser and also enabled the deletion of the record by ultraviolet irradiation.

For comparison, another storage medium was prepared by forming only a recording layer consisting of SP1822 on a substrate by the spin coating method. The spin coating was carried out under the Thin Film-Forming Condition 1. The thickness of the storage medium was 120 angstroms.

This storage medium was irradiated with ultraviolet light at 35° C. for 30 minutes with an ultraviolet lamp, and the recording layer was observed with an optical microscope. As a result, cohesions having a size of 8-12 microns were observed in the layer.

EXAMPLE 2

In Examples 2-8, storage media were prepared by the Langmuir-Blodgett method.

A storage medium was prepared using SP1822 as an organic dye, and the influence of the controlling layer to the properties of the medium was investigated.

A 1 mmole/liter solution of SP1822 in benzene and a 1 mmole/liter solution of stearic acid in benzene were prepared. SP1822 was accumulated by the Langmuir-Blodgett method (hereinafter referred to as LB method) under the following conditions on a substrate of quartz.

Accumulating Condition 1:
  Subphase: pH 7/phosphate buffer
  Temperature: 18° C.
  Compression speed: 2,800 mm2/min
  Accumulating pressure: 20 mN/m Barium stearate was accumulated under the conditions shown below by the LB method. As shown in FIG. 4, the storage medium was constructed so that one recording layer consisting of two monomolecular layers containing the dye SP1822 and one controlling layer consisting of two monomolecular layers of barium stearate were laminated alternately.

Accumulating Condition 2:
  Subphase: pH 8.6/BaCl$_2$=4×10$^{-4}$ mole/liter, KHCO$_3$=5×10$^{-5}$ mole/liter
  Temperature: 18° C.
  Compression speed: 2,800 mm$^2$/min.
  Accumulating pressure: 30 mN/m The storage medium was irradiated with ultraviolet light at 35° C for 30 minutes with an ultraviolet lamp. A reaction of converting the colorless form to the colored form proceeded. Optical microscopic observation of the recording layer revealed that the cohesions had a size of 1.0 micron or less and the dye was uniformly dispersed in the recording layer.

This recording layer enabled the recording with a visible laser and also enabled the deletion of the record by ultraviolet irradiation.

Figure 5:
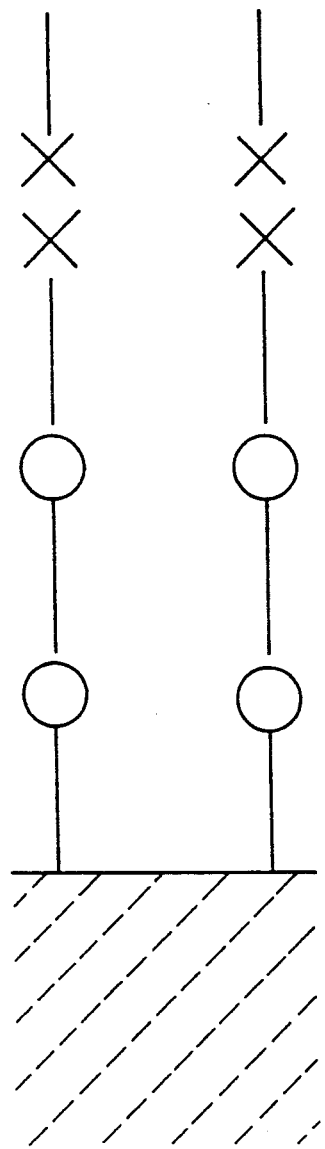

Also in the case where the type of accumulation of recording layers was X type (FIG. 5) or Z type (FIG. 6), the size of cohesion after the same treatment as above was 1.0 micron or less and the dye was uniformly dispersed in the recording layer.

For comparison, only two monomolecular layers of SP1822 was laminated on the substrate under the Accumulating Condition 1 of Example 2. The storage medium thus obtained had a construction such that the controlling layer consisting of barium stearate was subtracted from the construction illustrated in FIG. 4.

These storage media were irradiated with ultraviolet light at 35° C. for 30 minutes with an ultraviolet lamp. Optical microscopic observation revealed that, in these two storage media, the size of cohesion was as large as 5-10 microns.

EXAMPLE 3

A storage medium was prepared using SP1801 as an organic dye, and the influence of the controlling layer to the properties of the medium was investigated.

Figure 7:
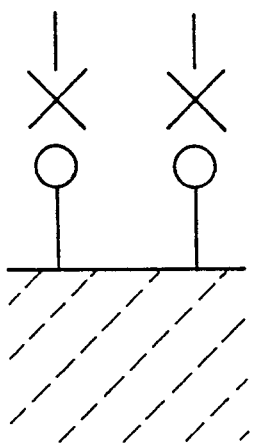

Thus, a monomolecular layer of SP1801 and a monomolecular layer of barium stearate were laminated onto a substrate of polycarbonate. Accumulation of SP1801 was carried out under the Accumulating Condition 1 shown in Example 2. Barium stearate was accumulated under the Accumulating Condition 2 shown in Example 2. FIG. 7 illustrates the construction of the storage medium thus obtained.

The storage medium was irradiated with ultraviolet light at 35° C. for 30 minutes with an ultraviolet lamp and the recording layer was observed with an optical microscope. As a result, no formation of cohesion was found. It became possible to form recording bits comparable to the recording wavelength, so that the memory capacity of the medium was remarkably increased.

This recording layer enabled the recording with a visible laser and also enabled the deletion of the record by ultraviolet irradiation.

EXAMPLE 4

A storage medium was prepared using CN18 as a dye, and the influence of the controlling layer to the properties of the medium was investigated.

A 1 mmole/liter solution of CN18 in benzene was prepared. Two monomolecular layers of CN18 and two monomolecular layers of barium stearate were accumulated onto a substrate of quartz. The former was accumulated under the Accumulating Condition 1 shown in Example 2, while the latter was accumulated under the Accumulating Condition 2. FIG. 4 illustrates the construction of the storage medium.

After heating the storage medium at 35° C. for 30 minutes, the recording layer was observed with an optical microscope. It was revealed that the size of cohesion was 1.0 micron or less and the dye was uniformly dispersed in the recording layer.

For comparison, only two monomolecular layers of the dye CN18 were accumulated on a substrate under the same conditions as above. The storage medium thus obtained had the same construction as in FIG. 4, except that it contained no controlling layer consisting of barium stearate. After heating the medium at 35° C. for 30 minutes, it was observed with an optical microscope to reveal that the size of cohesion was as large as 5-10 microns.

EXAMPLE 5

Using SP1822 as a dye, a recording layer having monomolecular layers of a mixture of a dye and another compound was prepared to investigate the influence of the mixture to the properties of the medium. As the mixed material, octadecane was used.

Thus, a solution of SP1822/octadecane (1/2) in benzene having an SP1822 concentration of 1 mmole/liter was prepared. Using this solution, two monomolecular layers were accumulated onto a substrate of quartz under the Accumulating Condition 1 shown in Example 2. Then, two layers of barium stearate were accumulated thereon under the Accumulating Condition 2. The storage medium thus obtained had the same construction as in Example 2 except that the monomolecular layers of SP1822 were replaced by monomolecular layers of SP1822/octadecane ($\frac{1}{2}$) (cf. FIG. 4).

The medium was irradiated with ultraviolet light at 35° C. for 30 minutes with an ultraviolet lamp and observed with an optical microscope. As a result, it was revealed that the size of cohesion was as small as 0.5 micron or less.

EXAMPLE 6

Using SP1822 as a dye, a recording layer having monomolecular layers of a mixture of a dye and another compound was prepared to investigate the influence of the mixture to the properties of the medium. As the compound to be mixed with the dye, stearic acid was used.

Figure 8:
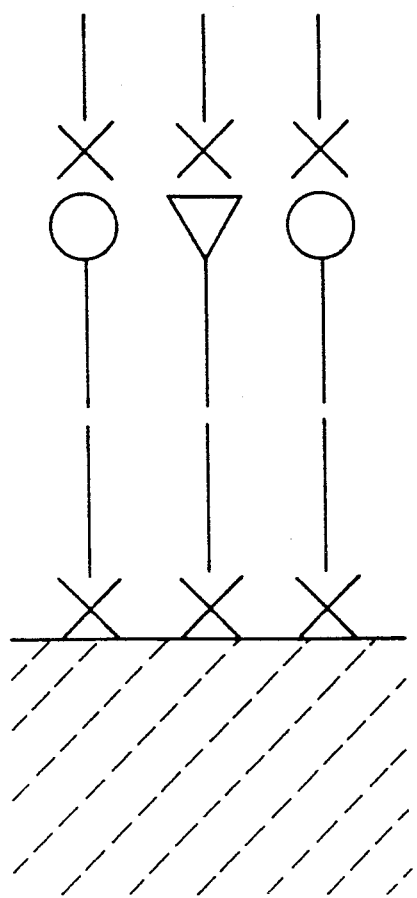

Onto a substrate of quartz, one monomolecular layer of a 1:8 mixture of SP1822 and stearic acid, and two monomolecular layers of barium stearate were laminated. The former was accumulated under the Accumulating Condition 1 as in Example 2 by using 1 mmole/liter solution of SP1822/stearic acid ($\frac{1}{8}$) in benzene, and barium stearate was accumulated under the Accumulating Condition 2. FIG. 8 illustrates the construction of the storage medium thus obtained.

The medium was irradiated with ultraviolet light at 35° C. for 30 minutes with an ultraviolet lamp, and the recording layer was observed with an optical microscope. As a result, no formation of cohesion was found. Further, it was heated at 50° C. for 30 minutes. However, still no formation of cohesion was found. Thus, the medium having recording bits comparable to the recording wavelength could be obtained. The memory capacity of the medium was remarkably increased.

This recording layer enabled the recording by the use of a visible laser and the deletion of the record by ultraviolet irradiation.

When stearylamine, stearamide, stearyl alcohol or barium stearate was used as the compound to be mixed with the dye, a similar effect was obtained.

EXAMPLE 7

In this example, a storage medium having a plurality of recording layers was prepared and the influence of the controlling layer to the properties of the medium was investigated. As the dye, SP1822 was used.

One monomolecular layer of SP1822 and one monomolecular layer of barium stearate were alternately accumulated onto a substrate of quartz to form recording layers 1 to 10 to obtain a storage medium. The monomolecular layer of SP1822 was accumulated under the Accumulating Condition 1 of Example 2, while the monomolecular layer of barium stearate was accumulated under Accumulating Condition 2. FIG. 9 illustrates the construction of the storage medium thus obtained.

The medium was irradiated with ultraviolet light at 35° C. for 30 minutes with an ultraviolet lamp, and the recording layer was observed with an optical microscope. As a result, no formation of cohesion was found.

This recording layer enabled the recording by the use of a visible laser and the deletion of the record by ultraviolet irradiation.

EXAMPLE 8

In this example, a storage medium having two recording layers but having a different number of monomolecular layer was prepared, and the influence of the recording layers consisting of a different number of monomolecular layers to the properties of the medium was investigated. As the dye, SP1822 was used.

Onto a substrate of quartz, three monomolecular layers of the dye SP1822 and four monomolecular layers of barium stearate were accumulated. The former was accumulated under the Accumulating Condition 1 of Example 2, while the latter was accumulated under the Accumulating Condition 2. FIG. 2 illustrates the construction of the storage medium thus obtained. As seen in the figure, the medium had two recording layers, namely recording layer 1 consisting of one monomolecular layer and recording layer 2 consisting of two monomolecular layer.

The medium was irradiated with ultraviolet light at 35° C. for 30 minutes with an ultraviolet lamp, and it was observed with an optical microscope. As a result, cohesions other than those having a size of 1.0 micron or less were not observed and the dye was uniformly dispersed in the medium. The storage medium had absorption maxima at 618 nm and 585 nm. This property is advantageously utilized to enable the wavelength multiplexing recording with the recording layers 1 and 2 with lights of different wavelengths, thereby to double the memory capacity.

EXAMPLE 9

The influence of the compound constituting the controlling layer on the properties of the medium was investigated. As the dye, SP1822 was used.

First, two monomolecular layers of SP1822 and two monomolecular layers of $C_{31}H_{63}COOH$ were accumulated onto a substrate of quartz. The former was accumulated under the Accumulating Condition 1 as in Example 2. The latter was accumulated by using 1 mmole/liter solution of $C_{31}H_{63}COOH$ in benzene under the Accumulating Condition 1 as in Example 2, except that the accumulating pressure was varied to 30 mN/m. The storage medium thus obtained had the same construction as in FIG. 4, except that the barium stearate was replaced by a monomolecular layer of $C_{31}H_{63}COOH$.

The medium was irradiated with ultraviolet light at 35° C. for 30 minutes with an ultraviolet lamp, and the recording layer was observed with an optical microscope. As a result, the size of cohesion was 1.0 micron or less and the dye was uniformly dispersed in the recording layer.

This recording layer enabled the recording by a visible laser and the deletion of the record by ultraviolet irradiation.

Each of the recording layers described above was combined with a controlling layer including $C_{18}H_{37}COOH$ or $C_{13}H_{27}COOH$ to obtain storage media. Accumulation of the monomolecular layer of each long chain fatty acid was carried out under the same accumulating conditions as in the case of $C_{31}H_{63}COOH$.

Both of the storage media thus obtained were irradiated with ultraviolet light at 35° C. for 30 minutes with an ultraviolet lamp. The observed size of cohesion was 1.0 micron or less and the dye was uniformly dispersed in the recording layer, in both of the storage media.

Optical storage media having a controlling layer consisting of any of cadmium stearate, stearyl alcohol, stearylamine and stearamide were prepared under the same conditions as above. In these cases, the size of cohesion was 1.0 micron or less and the dye was uniformly dispersed in the recording layer, either.

A storage medium was prepared by using zinc valerate in the controlling layer. Formation of the layers was carried out by the spin coating method. Conditions of the formation of the zinc valerate layer were as follows.

Thin Film-Forming Condition 3:
  Controlling layer Zinc valerate: 1.0% (by weight) aqueous solution, 2,000 rpm A recording layer consisting of SP1822 was formed under the Thin Film-Forming Condition 1 shown in Example 1. FIG. 3 illustrates the construction of this storage medium.

The medium was irradiated with ultraviolet light at 35° C. for 30 minutes with an ultraviolet lamp, and the recording layer was observed with an optical microscope. As a result, it was revealed that the size of cohesion was 2.0 microns or less and the dye was uniformly dispersed in the recording layer.

The medium having a controlling layer formed by using barium propionate or zinc caproate instead of zinc valerate gave the same advantages as above.

What is claimed is:

1. An optical storage medium comprising:
   (1) a substrate,
   (2) ultra-thin recording layers containing a dye, wherein each of the ultra-thin recording layers is composed of one or two monomolecular layers, and
   (3) controlling layers which comprise at least one member selected from the group consisting of fatty acids, metallic salts of fatty acids, alcohols, amines and amides,
   the recording layers and the controlling layers being accumulated alternately onto the substrate and the uppermost layer being a controller layer.

2. The medium of claim 1, wherein the dye comprises a photochromic compound.

3. The medium of claim 2, wherein the photochromic compound is a photochromic compound having the formula:

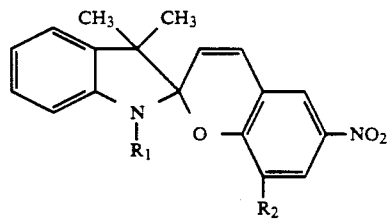

wherein $R_1$ represents a hydrocarbon group and $R_2$ represents $R_3'$ —$OR_3$ or —$CH_2OCOR_3$ wherein $R_3$ is hydrogen or a hydrocarbon group, provided that $R_1$ and $R_3$ both have 31 or less carbon atoms and at least one of $R_1$ and $R_3$ is a hydrocarbon group having 11 to 31 carbon atoms.

4. The medium of claim 1, wherein the recording layer comprises, in addition to the dye, at least one member selected from the group consisting of fatty acids, metallic salts of fatty acid, alcohols, amines, hydrocarbons and amides.

5. The medium of claim 1, wherein the monomolecular layer is formed according to Lamgmuir-Blodgett method.

6. An optical storage medium comprising:
   (1) a substrate,
   (2) an ultra-thin recording layer containing a dye, wherein the ultra-thin recording layer is composed of one or two monomolecular layers, and
   (3) a controlling layer which comprises at least one member selected from the group consisting of fatty acids, metallic salts of fatty acids, alcohols, amines and amides,
   the recording layer (2) being sandwiched between the substrate (1) and the controlling layer (3).

7. The medium of claim 6, wherein at least one unit consisting of a controlling layer and a recording layer is provided between the recording layer (2) and the controlling layer (3).

8. The medium of claim 6 or 7, wherein at least one controlling layer is provided between the substrate (1) and the recording layer (2).

* * * * *